Patented Jan. 30, 1923.

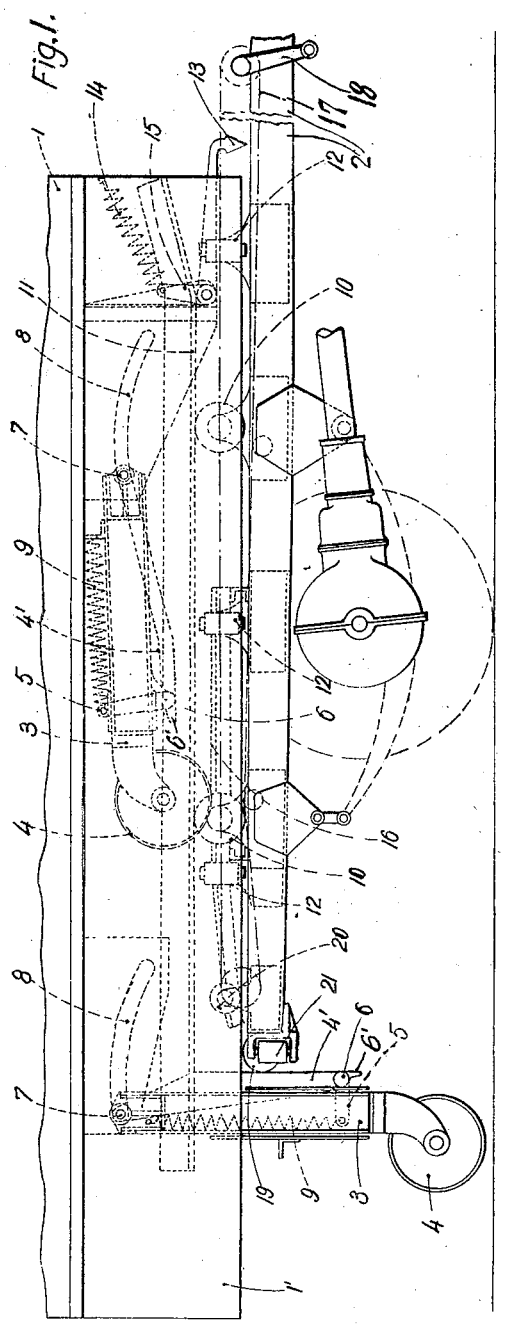

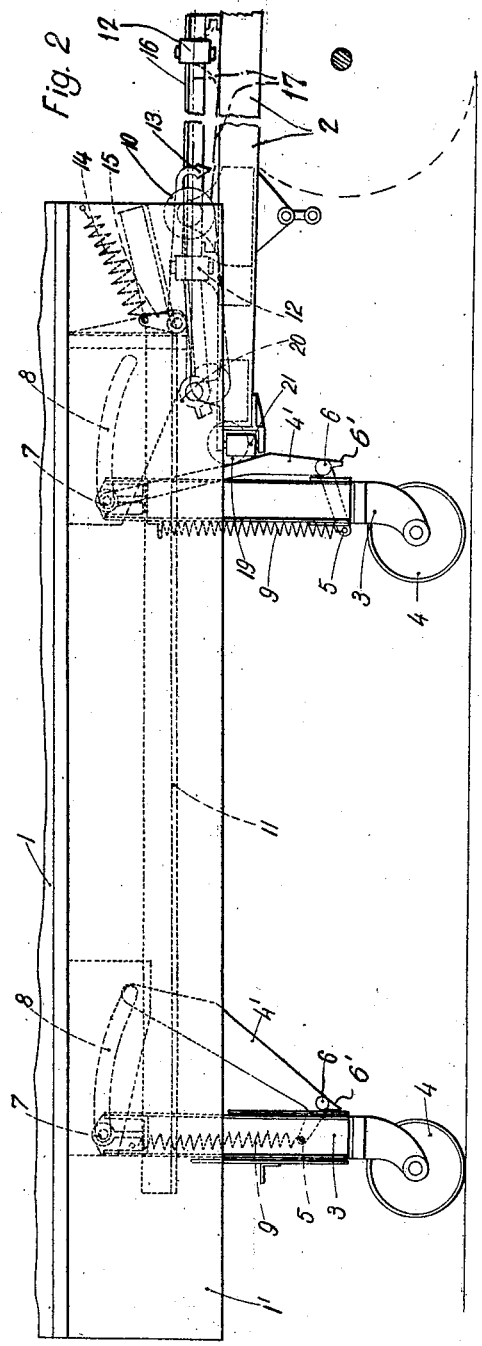

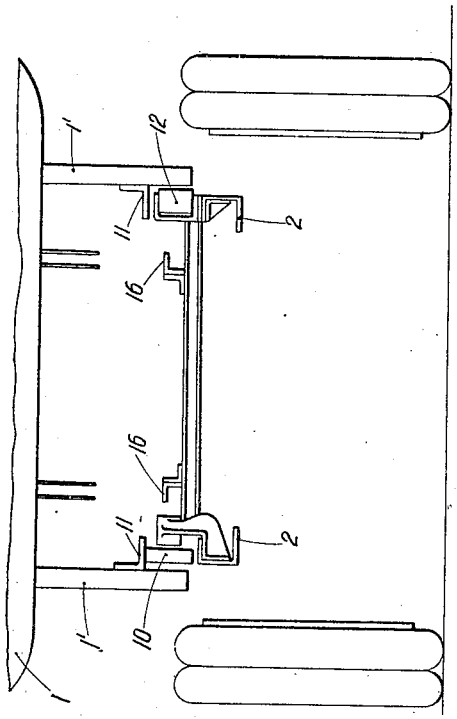

1,443,594

UNITED STATES PATENT OFFICE.

LÉON SAIVES, OF BILLANCOURT, FRANCE, ASSIGNOR TO LOUIS RENAULT, OF BILLANCOURT, FRANCE.

AUTOMOBILE AND LIKE VEHICLE.

Application filed December 18, 1920. Serial No. 431,640.

*To all whom it may concern:*

Be it known that I, LÉON SAIVES, citizen of the French Republic, residing at Billancourt, Department of the Seine, in France, and having P. O. address 15 Rue Gustave-Sandoz, in the said city, have invented certain new and useful Improvements in or Relating to Automobiles and like Vehicles; and I do hereby declare the following to be a full, clear, and exact description of the invention, such as will enable others skilled in the art to which it appertains to make and use the same.

The present invention relates to automobile wagons of the kind comprising a body which is adapted to be removed from or placed on the chassis of the wagon, and its object consists in arranging the body in such a way that, when extended or removed from the chassis, the body is supported by a certain number of legs on wheels so that said body can be handled with ease. When the body is replaced on the wagon, the said legs move out of sight and fold underneath. This system presents the advantage of releasing the chassis during the time the body is being loaded or discharged, thus considerably increasing the capacity of the rolling stock.

In the accompanying drawings

Figure 1 illustrates a side elevation of the body, partly displaced on the chassis.

Figure 2 a view similar to Figure 1 shewing the body almost completely displaced from the chassis.

Figure 3 is a rear view of the chassis, the body being represented diagrammatically.

The combination of body and chassis comprises the following parts and members:—

The body is indicated at 1 and 1', the chassis of the wagon at 2. As shewn in Figure 2, the body is supported by four legs 3, two in front and two behind, when extended or removed from the chassis. In Figure 1, in which the body is only partly displaced along the chassis two of the legs are still folded under the body. Of course, if considered desirable, three legs only may be used two in front and one behind, without departing from the essential features of the mechanism hereinafter described.

The legs 3 are mounted on wheels 4, preferably arranged to swivel like ordinary chair castors and the legs are also provided with struts 4' and are hinged at 7 so as to be moved out of sight completely, under the body. In the tipping movement of the legs, round the joints 6, the struts 4' open out or close up according to the vertical or the horizontal position of the leg. In order to obtain this result the strut 4' is pivoted at 6 on the leg 3, and a short arm 5, integral with and placed at right angles to said strut is subjected to the continuous influence of a spring 9 which tends to turn the strut 4' on its pivot 6. The upper end of the strut 4' is adapted to slide in a curved slot 8 (indicated in dotted lines) having the centre of the pivot 6 as the centre of its radius of curvature. This slot is cut in a plate secured to the bottom of the body, so that, when the leg assumes the vertical position, the spring acting on the arm 5 causes the strut to turn on the pivot 6 and to take up the position shewn on the left in Figure 2. When the leg is folded back under the body, the arm 5 closes up by sliding in the slot 8, and thus takes up the position shewn in Figure 1, where the leg is indicated in dotted lines. It will be observed that when in the vertical position the strut 4' acts as a stay, a heel-piece 6' being provided on the arm 5, a little below the pivot 6, to bear against the leg.

In order to understand the action of the device, the case may be taken in which it is desired to extend and remove the body from the wagon. For this purpose the first thing to be done is to cause the swing hook 13, Figure 1 to engage in an endless chain 17 the said hook being integral with an arm 15, which is continuously acted on by the pull of a spring 14, to which it is connected. By turning a crank 18, the endless chain can be made to travel in either direction, for example from right to left—movement of the top side of the chain—when the body is to be removed from the wagon. In Figure 1 the body is supposed to have already moved a certain distance and the legs on the left have already taken up the vertical position.

During this movement the body has rolled on lateral rollers 10 (secured on the chassis by means of angle-iron 11) whilst other rollers 12, on vertical pivots secured to the chassis, guide the body laterally.

When the body continues its travel towards the rear, the leg-wheels 4, which run on a rail-track 16, leave this track at a certain moment, and the legs take up an oblique position, and bear against the rollers 19 mounted on the back end of the chassis. It will be observed that the rail-track 16 terminates at the rear end, in a ramp, whilst on the other hand the angle-irons 11 secured on the chassis turn upwards near the front end of the wagon.

When the body is fully released and the four legs are in the vertical position, the hook 13 having reached the end of its travel is disengaged from the endless chain 17 being lifted therefrom by a roller 20. The body can then be handled as required, by rolling it on its wheels.

To replace the body on the running gear or chassis, the operations are reversed, the body being pushed home into the back end of the chassis and the hook 13 engaged with the endless chain. The slope of the angle-irons 11 which facilitates the descent or unloading of the box assists the operation of mounting or loading the body on the vehicle. By turning the crank 18 in the desired direction, the body is pulled forward and the legs fold up automatically under it. Vertical rollers 21, mounted at the back end of the chassis guide the body on entering.

It will be evident to any technical person that modifications in the details of the device may be made without departing from the nature of the invention.

Claims:

1. In a vehicle, the combination with a chassis, of a body movable relative to said chassis, legs pivoted to said body and normally tending to swing downwardly when the body is moved from the chassis, struts pivoted at one end to the respective legs and having sliding engagement at the other end with said body, springs normally pressing the struts to angularly displace the same relatively to their respective legs to act as braces therefor, and means operative to close the struts on their respective legs and to move the latter upwardly as the body is moved onto the chassis.

2. In a vehicle, the combination with a chassis, of a body movable relative thereto, means for sliding said body longitudinally of the chassis, cooperating trackways and rollers carried by said body and chassis, legs pivoted to said body, a strut having a short arm angular extension, pivoted at the lower end of each leg, a curved slot extending from the pivotal point of each leg in which the upper end of said strut is adapted to slide, and tension means connecting the short arm of each strut with the upper end of their respective legs, whereby said struts will be automatically swung on their pivots by the contraction of said tension means upon the swinging downwardly of the respective legs, as said body is moved from the chassis.

3. In a vehicle, the combination with a chassis, of a body movable relative thereto, means for sliding said body longitudinally of said chassis, cooperating trackways and rollers carried by said body and chassis, legs pivoted to said body, a strut, having a short arm angular extension, pivoted at the lower end of each leg, a curved slot extending from the pivotal point of each leg in which the upper end of said strut is adapted to slide, tension means connecting the short arm of each strut with the upper end of their respective legs, whereby said struts will be automatically swung on their pivots by the contraction of said tension upon the swinging downwardly of their respective legs, as said body is moved from the chassis, and means carried by the rear of the chassis adapted to engage said struts to collapse the same and permit the swinging upwardly of said legs as the body is moved onto said chassis.

4. In an automobile vehicle and the like, the combination with a chassis, of a body movable relative thereto, and an endless chain mounted longitudinally of the chassis, means for moving said chain in either direction, means carried by the body adapted to be engaged with and disengaged from said channel for sliding said body longitudinally of the chassis, co-operating trackways and rollers carried by said body and chassis, legs pivoted to said body, rollers carried by the lower ends of said legs, a strut, having a short arm angular extension, pivoted adjacent the lower end of each leg, a curved slot extending from the pivoted point of each leg in which the upper end of said strut is adapted to slide, tension means connecting the short arm of each strut with the upper end of their respective legs whereby said struts will be automatically swung on their pivots by the contraction of said tension means, upon the swinging downwardly of their respective legs, as said body is moved from the chassis, and rollers carried by the rear of the chassis adapted to engage said struts to collapse the same and permit the swinging upwardly of said legs, as the body is moved onto said chassis.

In testimony whereof I affix my signature.

LÉON SAIVES.